Dec. 31, 1940.  H. D. GEYER ET AL  2,226,605
PNEUMATIC CUSHION
Filed March 25, 1938   2 Sheets-Sheet 1
Fig. 1
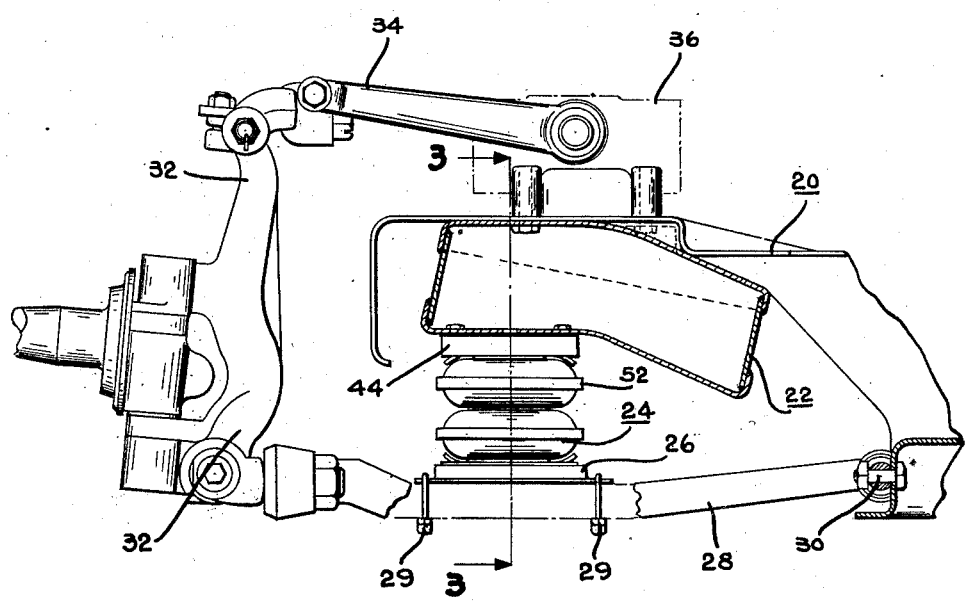
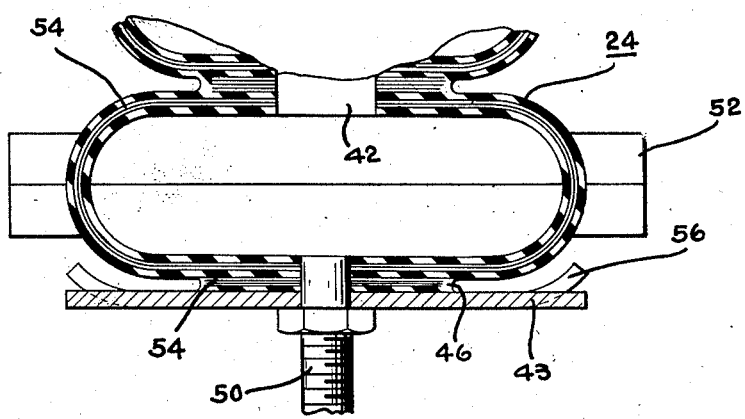
Fig. 2
INVENTORS
WILLIAM S. WOLFRAM
AND
BY HARVEY D. GEYER
Spencer Hardman & Fehr
their ATTORNEYS Dec. 31, 1940. H. D. GEYER ET AL 2,226,605
PNEUMATIC CUSHION
Filed March 25, 1938  2 Sheets-Sheet 2
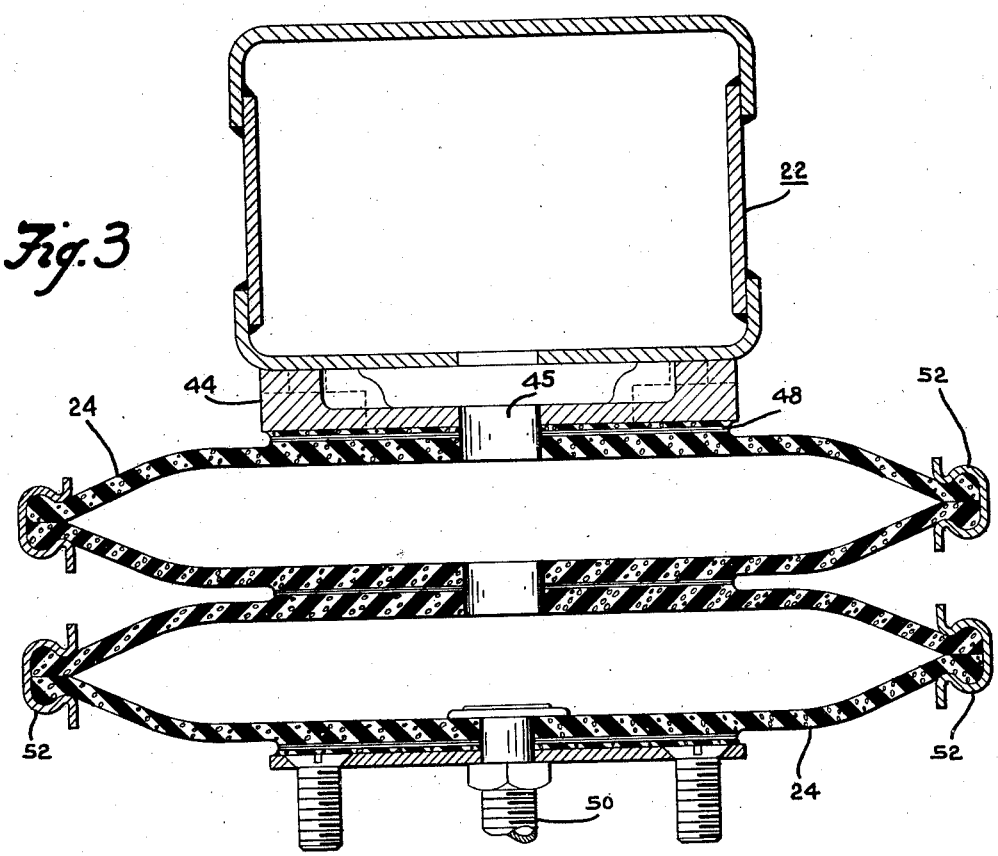
Fig. 3
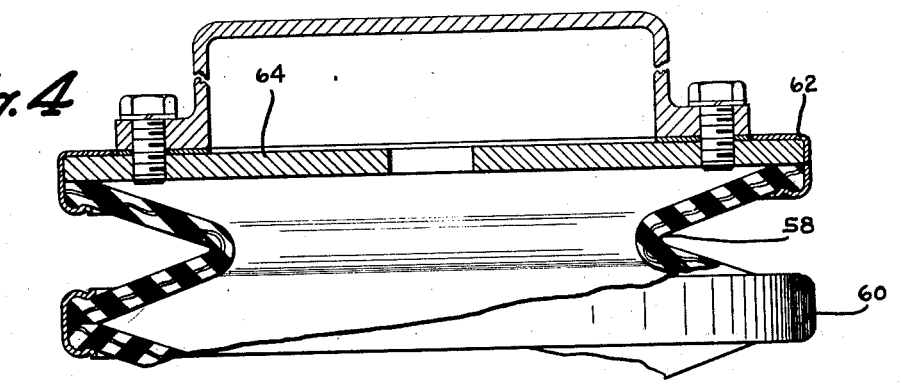
Fig. 4
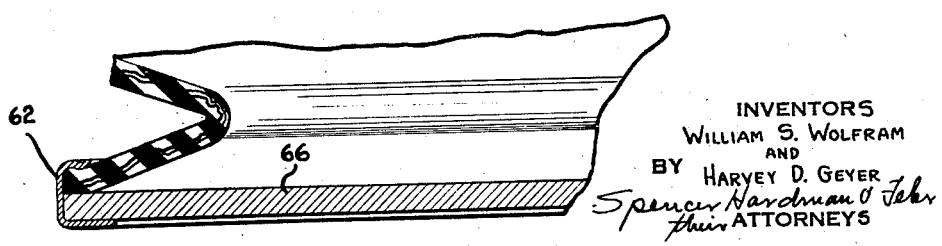
INVENTORS
WILLIAM S. WOLFRAM
AND
BY HARVEY D. GEYER
Spencer Hardman & Jehr
their ATTORNEYS Patented Dec. 31, 1940

2,226,605

UNITED STATES PATENT OFFICE 2,226,605

PNEUMATIC CUSHION

Harvey D. Geyer and William S. Wolfram, Dayton, Ohio, assignor to General Motors Corporation, Detroit, Mich., a corporation of Delaware Application March 25, 1938, Serial No. 198,010

2 Claims. (Cl. 267—65)

This invention relates to a pneumatic cushion or bag of the type used in connection with wheel suspensions and to the method of making the same.

One of the objects of the invention is to provide a pneumatic cushion comprising a bag of resilient material and having an open end and means also being provided for hermetically sealing said open end.

Another object of the invention is to provide a pneumatic spring for a wheel suspension that includes a plurality of resilient communicating bags bonded together to form a substantially integral structure, metallic supporting members being provided at either end of the spring and attached thereto by a vulcanized bond.

Another object of the invention is to provide a pneumatic spring for a wheel suspension which comprises a plurality of reinforced communicating resilient bags of substantially tubular shape and having open ends thereon, metallic clamps being provided for clamping the open edges of each of said bags in sealed engagement with each other.

In carrying out the above objects it is a further object to provide a metallic reservoir associated with one of said supporting members. Another object is to provide means for controlling the rate of deflection of said spring said means being associated with the other of said supporting members and including a metallic plate which may be turned up at the edges thereof to form a support for the adjacent bag.

Another object of the invention is to provide a method of making a pneumatic bag which comprises molding a flexible bag around a central mold member so as to form a continuous resilient sleeve having open ends thereon, withdrawing the mold member from the sleeve through one of said open ends and then closing the open ends of the sleeve by means of clamps.

Further objects and advantages of the present invention will be apparent from the following description, reference being had to the accompanying drawings wherein a preferred embodiment of the present invention is clearly shown.

The pneumatic spring or cushion which comprises the subject matter of the present invention is particularly adapted for use in automobiles as a substitute for the conventional type of leaf spring. The pneumatic spring as herein disclosed is easier to construct, requires less space, it is neater in appearance than the usual type of leaf spring, as well as yielding a smoother ride to the occupants of the vehicle. Furthermore, since the spring is highly resilient it does not transmit road vibrations to the chassis of the car as readily as a metallic leaf spring and therefore is highly desirable for use as a wheel suspension in automotive vehicles. Preferably the cushions or bags to be hereinafter described are fabricated from rubber, synthetic rubber or some rubber-like resilient material and may or may not include fabric or cord reenforcement, according to the contemplated use thereof.

In the drawings:

Fig. 1 illustrates a fragmentary view, partly in section, of an improved pneumatic spring mounted as a wheel suspension on an automobile.

Fig. 2 is a fragmentary view, in section, of one bag or cushion of the spring shown in Fig. 1.

Fig. 3 is an enlarged cross sectional view taken on line 3—3 of Fig. 1, and

Fig. 4 is a fragmentary view, partly in section, of a modified construction of the spring.

Referring to the drawings, an automobile frame 20 is shown to which is bolted a fluid reservoir 22 that is associated with a two bag pneumatic spring 24. The lower end of spring 24 is associated with a support plate 26 that in turn is bolted tightly to a wishbone 28 by means of bolts 29. The wishbone 28 is movably secured at one end thereof as at 30 to the frame 20 and is secured to a king pin support member 32, for the front wheel, at the other end thereof. The upper end of the king pin support 32 is attached to an arm 34 of a shock absorber 36, that is likewise bolted to the frame 20.

Referring particularly to Fig. 2 the construction of the bags of the pneumatic spring 24 may be noted. Each bag, or cushion, is made of a continuous tubular sleeve, preferably having two open ends thereon. This fabrication is carried out on a central mold section that is withdrawn through an open end after the formation of the sleeve. These tubular sections 24 are then vulcanized together adjacent the center portions thereof to form a neck therebetween of considerably greater thickness than the remainder of the resilient sleeves. Suitable communication such as aperture 42 is provided between adjacent bags. If desired the bags can be fabricated integrally, thereby eliminating the vulcanizing operation, if a multiple central mold is used. Also if desired one end of the bag may be made closed leaving only one open end thereon, through which the mold section may be withdrawn. The end bags of the spring 24 are vulcanized to a support plate 43 and a reservoir support 44 by a vulcanized bond as at 46 to 48 respectively. A valve stem 50 similar to an innertube valve stem, is provided in the bag that is bonded to support plate 43 and extends therethrough so that the spring and reservoir may be inflated with air or other fluid. A valve or other restricting means (not shown) is preferably placed in the communicating passage 45 between the reservoir 22 and the bag to control the rate of air flow therethrough, such a valve being either automatically or manually controlled.

In order to provide the hermetic closure of the spring 24 a plurality of clamps 52 are provided which are used to clamp the open edges of the tubular sleeves into sealing engagement with one another and thereby form bags. It is preferable to cement the inner edges of the ends of the sleeves prior to the clamping to insure a hermetic closure although the clamps 52 alone are usually sufficient for this purpose.

In some cases it is desirable to reinforce the bags with cords such as is shown at 54. The cord runs circumferentially around the bag and prevents the resilient material from which the bag is fabricated from being ruptured due to excessive strains thereon.

The principle of operation utilized in connection with the present invention resides in the compression of the fluid within the pneumatic spring 24 which due to deflection of the spring is raised in the pressure against the body of the fluid held within the reservoir 22. In this manner when the wheel of the automobile goes over a bump in the road, the pressure within the pneumatic spring is increased due to the deflection of the spring and the reduction of volume therein. When the wheel resumes its normal position the pressure within the pneumatic spring causes the same to assume its normal shape. The conjoint action of the shock absorber 36 aids in stabilizing the cushioning effect of spring 24. Thus providing a smooth ride to the occupants of the vehicle.

In order to vary the rate of deflection of the spring 24 the bearing surface provided therefor, namely, plate 43 may be changed by bending the edges of the plate 43 upwardly as shown at 56. In this manner the lower bag of the spring is confined to some extent, which changes the rate of deflection thereof. Another means of regulating the ride quality of the automobile is to accurately adjust the quantity or pressure of air within the pneumatic spring if air be the pneumatic fluid used.

Fig. 4 shows a modified construction of a pneumatic spring in which annular rings 58 made from resilient material are utilized. In cross-section these rings may be observed to have a lesser diameter at the central portion thereof than at either of the end portions. In this manner a series of sections 58 may be clamped by annular clamping rings 60 to form a pneumatic spring. The spring so formed is then clamped at either end thereof by means of clamps 62 to supporting member 64 and 66 respectively which are attached to the reservoir 22 and support plate 42 respectively.

From the foregoing it will be observed that we have provided a simple, inexpensive pneumatic spring or cushion which has a unitary assembly with its own reservoir and therefore is adjustable independently of the other springs on the car. The pneumatic spring as hereinbefore described substantially reduces the transmission of road vibrations to the occupants of the car and likewise provides a resilient suspension which may be substituted for the conventional type of leaf spring construction.

While the embodiment of the present invention as herein disclosed, constitutes a preferred form, it is to be understood that other forms might be adopted, all coming within the scope of the claims which follow.

What is claimed is as follows:

1. A pneumatic spring for wheel suspensions comprising a plurality of vertically arranged tubular pneumatic bags bonded together along their surfaces of contact, said tubular bags being closed at the ends by clamps, a metallic reservoir of greater volume than the combined volumetric capacity of said bags supported by and communicating with the uppermost of said bags, and means providing pneumatic communication between said bags.

2. A pneumatic spring for wheel suspensions comprising a plurality of vertically arranged tubular pneumatic bags bonded together along their surfaces of contact, said tubular bags being closed at the ends by clamps, a metallic reservoir of greater volume than the combined volumetric capacity of said bags supported by and communicating with the uppermost of said bags, means providing pneumatic communication between said bags, a supporting plate supporting the lower of said bags and vulcanized thereto, both said metallic reservoir and said supporting plate being provided with curved end portions directed towards the surfaces of said bags adjacent thereto and adapted to be engaged thereby to vary the rate of deflection of said spring.

HARVEY D. GEYER.
WILLIAM S. WOLFRAM.